Patented Apr. 8, 1930

1,753,790

UNITED STATES PATENT OFFICE

KAMETARO KAWAI, OF TOKYO, JAPAN

METHOD OF PREPARING CONCENTRATED COD-LIVER OIL

No Drawing.    Application filed September 28, 1926. Serial No. 138,339.

The present invention relates to a method of preparing concentrated codliver oil, characterized by saponifying 50 to 75 per cent of the ordinary codliver oil by proper means and then separating and collecting the unsaponifiable matter containing vitamin-A and other effective ingredients from the saponified matter as much as possible. The object of this invention is to obtain very economically concentrated codliver oil rich in effective ingredients, suitable for codliver oil drops, jelly-like products, and other nutritious and invigorating preparations.

It has long been confirmed that codliver oil has a special nutritious and invigorating power, but opinions are at variance as to the true nature of its effective ingredients, although, thanks to the recent development of the theory of vitamin-A, it has been revealed that vitamin-A is one of the most important ingredients of it. Yet, it is very hasty to conclude that vitamin-A is the only effective ingredient, for there is considerable literature to the effect that codliver oil from which vitamin-A has been removed is still effective clinically and there is no counterproof denying it. Indeed, some of this literature explains that there exist more than two kinds of fat soluble vitamins, while others attribute the virtue to a particular group of fatty acids contained in the codliver oil.

I myself have gone only half the way in investigating the problem, but am in a position to say that while it may be good for a special object to extract so-called vitamin-A alone from the codliver oil and utilize the same, such a thing is rather important from the standpoint of the utilization of the codliver oil itself. Now, it is usual with codliver oil lovers to prefer codliver oil containing a large quantity of effective ingredients to vitamin-A alone, at least until it is positively proved that there exists in the codliver oil no other effective ingredients than vitamin-A. This is due to the fact that in our ordinary experiences mysterious effect is sometimes obtained from impure rather than pure substances. My invention meets such a requirement.

Example I

The object of my invention can be attained by saponifying 50 to 75 per cent of the ordinary codliver oil and then separatng the unsaponifiable matter containing vitamin-A and other effective ingredients from the saponified matter as much as possible by means of centrifugal apparatus.

For instance, add 700 c. c. of 20% caustic alkali (or soda) to 1000 grams of the ordinary codliver oil and saponify the same, stirring the mixture up for 2 hours at a temperature below 60° C. When the oil is saponified to the desired degree, the stirring is discontinued, whereupon the saponified matter will sink to the bottom of a vessel. Take away the oil remaining on the upper layer and remove the saponified matter therefrom by washing the same with cold or warm water or by some other proper means. Then, give it more than 5000 revolutions per minute by a centrifugal separating apparatus and separate therefrom an unsaponifiable matter rich in vitamin-A and other effective ingredients.

Example II

Add milk of lime to the common codliver oil and heat the same at a low temperature, introducing thereinto steam effective enough to prevent the oxidation of effective ingredients. After thus saponifying 50 to 75 per cent of the codliver oil, remove the saponified matter and water therefrom and collect vitamin-A and other effective ingredients.

For instance, mix 1000 grams of ordinary codliver oil, 120 grams of calcium hydroxide and 300 grams of water together. Stir the mixture up for four hours, introducing steam thereinto and complete the saponification to the desired degree. After cooling the same, separate calcium soap therefrom by filter press or a centrifugal apparatus. Then, keep the liquid still to separate oil layer from the layer of water or other impure matters. The oil layer is used as it is or sometimes is refined further by the ordinary means.

*Example III*

Add to the ordinary codliver oil the proper quantity of milk of lime containing alcohol, which helps the codliver oil to contact with the lime well. Heat the mixture at a low temperature, stirring it up, and thus saponify it. Then, separate the saponified matter and remove water, alcohol and other impure matters.

For instance, mix 1000 gram of ordinary codliver oil, 120 grams of milk of lime and 200 grams of alcohol together. Stir the mixture up, heating the same at about 70° C. for three hours and complete the saponification. After cooling the same, separate lime soap therefrom. Then, keep the liquid still to separate the layer of water, alcohol, etc. from oil layer. The oil layer is used as it is or sometimes is further refined by the ordinary means.

Claims:

1. A method of preparing concentrated codliver oil, characterized by saponifying 50 to 75 per cent of the ordinary codliver oil by proper means and then separating and collecting the unsaponifiable matter from the saponified matter as much as possible.

2. A method of preparing concentrated codliver oil, consisting in saponifying 50 to 75 per cent of the ordinary codliver oil and then separating the unsaponifiable matter from the saponified matter by centrifugal force.

3. A method of preparing concentrated codliver oil rich in vitamin-A. consisting in adding milk of lime to the ordinary codliver oil, heating the mixture at a low temperature while introducing steam therein to saponify 50 to 75 per cent of the codliver oil and then removing the saponified matter and water therefrom.

4. A method of preparing concentrated codliver oil rich in vitamin-A consisting in adding to the ordinary codliver oil a predetermined quantity of milk of lime mixed with alcohol, heating the mixture at a low temperature while stirring it up to saponify 50 to 75 per cent of the codliver oil and then separating the saponified matter, alcohol and water therefrom.

In testimony whereof I have affixed my signature.

KAMETARO KAWAI.